C. E. C. J. MANBY.
FINGER BOARD FOR VIOLINS OR LIKE STRING INSTRUMENTS.
APPLICATION FILED SEPT. 12, 1912.
1,095,900.
Patented May 5, 1914.
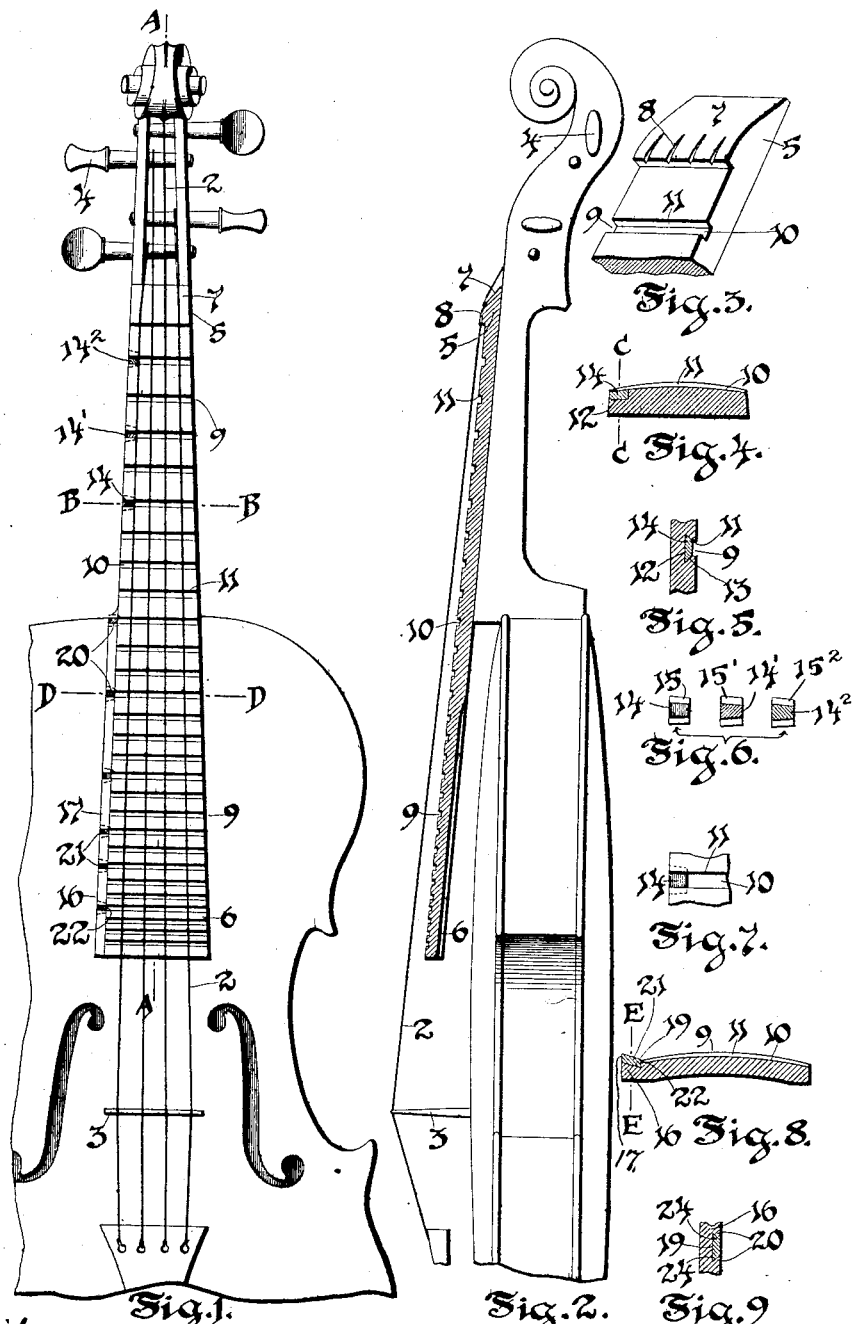

UNITED STATES PATENT OFFICE.

CHARLES EVELYN CREASY JENSEN MANBY, OF CHELTENHAM, VICTORIA, AUSTRALIA.

FINGER-BOARD FOR VIOLINS OR LIKE STRING INSTRUMENTS.

1,095,900.  Specification of Letters Patent.  Patented May 5, 1914.

Application filed September 12, 1912. Serial No. 719,961.

*To all whom it may concern:*

Be it known that I, CHARLES EVELYN CREASY JENSEN MANBY, a subject of the King of Great Britain and Ireland, residing at "Ulupna," Charman Road, in the post town of Cheltenham, in the shire of Moorabbin, in the county of Bourke, State of Victoria, Commonwealth of Australia, have invented a certain new and useful Improved Finger-Board for Violins or like String Instruments, of which the following is a specification.

This invention relates to string instruments such as the violin and has for its object to provide a finger board therefor by which the player will have the exact place indicated on the said board at which a string must be pressed down to produce a note in perfect tune. This is accomplished through the senses of sight and touch and permits of greater concentration upon technique and finish. Hitherto many suggestions have been made with the object of indicating upon the finger board precise positions for the depression of the strings of an instrument. Methods of coloring have been proposed and its has also been suggested to provide transverse grooves in the said board.

The present invention consists in a simple form of construction, as pointed out in the appended claims, involving the use of transverse grooves combined with colors therein to more particularly indicate and distinguish the said grooves individually to the player.

Referring to the drawings which form a part of this specification:—Figure 1 is a plan of a violin having a finger board constructed in accordance with this invention. Fig. 2 is a side elevation of a violin the finger board being shown in section. The line A—A Fig. 1, indicates the plane of section. Fig. 3 is an enlarged detail view of the far or peg end of a finger board according to this invention. Fig. 4 is an enlarged cross section on line B—B Fig. 1. Fig. 5 is a longitudinal detail section on line C—C Fig. 4. Fig. 6 is a plan view of the insets or indicators seen in Fig. 1 showing various colors. Fig. 7 is a plan of portion of a finger board showing the inset or indicator seen in Fig. 6 in position. Fig. 8 is a cross section on line D—D Fig. 1, showing a longitudinal side extension and an inset thereof. Fig. 9 is a longitudinal detail section on line E—E Fig. 8, showing the inset referred to therein.

The invention relates to an instrument such as a violin having strings 2 passing over a bridge 3 and regulated in tension by pegs 4 as is usual. Beneath the strings is a finger board having a far or peg end 5 and a near or bridge end 6. The precise conformation, length and size of the board may vary. The upper surface 7 of the far or peg end is declined toward the pegs 4 and formed in the upper surface 7 is a series of longitudinally disposed string grooves 8. The number and conformation of the said grooves may vary with circumstances. Formed in the said finger board is a series of transverse guide grooves 9, spaced to serve as frets in fingering the strings to obtain the chromatic scale. The width, depth and conformation of the grooves also may vary. For the lower notes the grooves are wider and may be deeper than for the higher ones, as shown. Each of the transverse grooves has a bottom 10 and two vertical side walls 11. Formed in such of the transverse grooves 9 as may be desired between the peg end of the board and the body of the instrument are color compartments. Each color compartment is situated at one end of a groove and its bottom 12 is situated below the bottom 10 of its groove. At each side of each sunken bottom is an overhanging wall 13. This in addition to being inclined or overhanging converges inwardly. The area of the color compartments may vary, but preferably it does not extend inwardly sufficient to be below a string of the instrument. Within these color compartments are insets 14, 14', 14² of different colors forming indicators. These may be of any suitable material, such as cakes of paint, and be of any desired color. They may also bear an indicating letter, mark or sign. Each inset extends the full length of its color compartment and terminates at the edge of the finger board. The inset 14 is provided with sides 15 inclining from the top of its upper surface downwardly and outwardly to conform to the overhanging walls 13 of its color compartment, while the insets 14' and 14² have sides 15' and 15² formed in the same manner. The sides of each inset also converge inwardly as do the walls 13 of the color compartments. The insets may be retained in position by frictional contact between the walls 13 and sides of the insets, or an agglutinant may be employed or they may be retained by pins or the like.

Extending longitudinally along the finger board is an extension 16. The extension preferably does not extend for the full length of the board but for portion thereof only. It may be situated at the lowest string side of the board and commence from where the finger board reaches the body of the instrument to which it is attached extending to the bridge end. The width of the said extension may vary and likewise its conformation to adapt the board to varying circumstances. The side extension 16 is provided with a longitudinal elevated outer edge 17. The amount of elevation of the said edge may vary with different instruments. Between the outer edge 17 and the edge of the finger board the extension is provided with a declined upper surface.

Formed in the longitudinal side extension 16 and below its declined surface is a series of color compartments. Each compartment consists of a bottom 19 and is situated opposite a groove 9 formed in the finger board. The depth of each compartment as also its width may vary. At each side of the bottom 19 is an overhanging or inclined wall 20, the extent of inclination varying with circumstances.

Accommodated by each color compartment of the side extension 16 is an inset 21 forming an indicator. Each inset is colored. It may also have upon it an indicating letter, mark or sign. Each extension inset may be formed of any suitable material or materials and may be retained within its color compartment by friction, an agglutinant, pins or the like. The inner edge 22 of each extension inset may contact against the finger board. The outer edge terminates at the outer edge 17 of the said side extension. The two sides 24 of each inset incline from its top surface downwardly and outwardly. They may also converge inwardly. The upper surface of each inset may be inclined upwardly to afford clearer inspection by the player. Or the said upper surface may be level with the surface 18 of the longitudinal extension 16; or it may upstand above the same.

With this invention it will be obvious that a color compartment may be provided in all of the transverse grooves 9 between one end of the extension 16 and the peg end 5 of the board. A color compartment may also be provided in the side extension for each groove 9 adjoining the said extension. Or, as shown in the drawings a color compartment may be provided for some grooves only and only certain grooves therefore be provided with an indicator. Any desired method of coloring may be adopted. The insets or indicators are removable thereby also providing interchangeability of the colors.

The extension may be removably attached to the finger board so that it may be attached in any well known way to either side thereof if desired.

By the use of the inclined surface 7 and the transverse grooves 9 the fingers of the player do not have to reach or spread so far and an increased ease in fingering is obtained, which is an important feature for small hands and youthful pupils.

The color insets may be of any material suc as metal, bone, or may be cakes of paint. The color insets are made short to prevent any possibility of alteration in the tone of a note which might occur if a string was stopped upon an inset. In use a pupil is taught that certain colors indicate certain notes. He memorizes this and therefore relies upon the sense of sight, and not merely upon that of touch. As there is more than one system of coloring notes for certain parts now used in sheet music it is desirable to have the insets removable so that they may be changed to correspond with any such system. Also interchangeable insets can be arranged by any musician to suit his own ideas and the sight of the pupil. Therefore the invention is not restricted to any particular system of coloring the insets and it is immaterial what colors are used. Every groove need not be provided with a colored inset as black could be utilized to indicate all sharps or flats. For example colored insets might be arranged as follows: gold—inset indicates note G; red—inset indicates note A; white—inset indicates note B; blue—inset indicates note C; green—inset indicates note D; yellow—inset indicates note E; pink—inset indicates note F; black—inset indicates sharp or flat. It is immaterial what the color arrangement is, provided the pupil knows what note will result by depressing a string at the position of an inset. Preferably the color insets are located adjacent the G string. Obviously different notes would be obtained by depressing other strings at the same grooves.

Having now described my invention, what I claim as new and desire to secure by Letters Patent is:—

1. A finger board having a series of transverse guides and a longitudinally disposed side extension, said side extension having a plurality of insets, each inset being situated opposite a transverse guide.

2. In combination, a finger board having a series of transverse guide grooves therein, and insets each accommodated by a transverse groove, the upper surface of each inset being level with the bottom of such groove; with a longitudinally disposed side extension attached to said board and having a plurality of insets, each inset being situated opposite a transverse groove in the board.

3. An improved finger board for violins or like string instruments having transverse guide grooves, and a side extension extending part of the length of the said board, and insets in the extension opposite grooves in the board.

4. The combination with a finger board having a series of transverse guide grooves therein, and a plurality of insets each accommodated by a transverse groove, of a longitudinally disposed side extension extending part of the length of the board and having a plurality of compartments each accommodating an inset, each inset being situated opposite a transverse groove.

5. In combination, a string instrument finger board having a series of transverse guide grooves, a plurality of insets each accommodated by a transverse groove and having its upper surface level with the bottom of the groove and not extending beneath the instrument strings, a side extension having an inclined upper surface and extending longitudinally for part of the length of the board and a plurality of insets on said extension, each inset being situated opposite a transverse groove in the board.

In testimony whereof I affix my signature in presence of two witnesses.

CHARLES EVELYN CREASY JENSEN MANBY.

Witnesses:
CECIL McCLASTRIER,
GEORGE A. M'REA.

Copies of this patent may be obtained for five cents each, by addressing the "Commissioner of Patents, Washington, D. C."